Oct. 11, 1949.  J. M. NICKELSEN ET AL  2,484,722
SPRING SEAT CONSTRUCTION
Filed Dec. 11, 1944
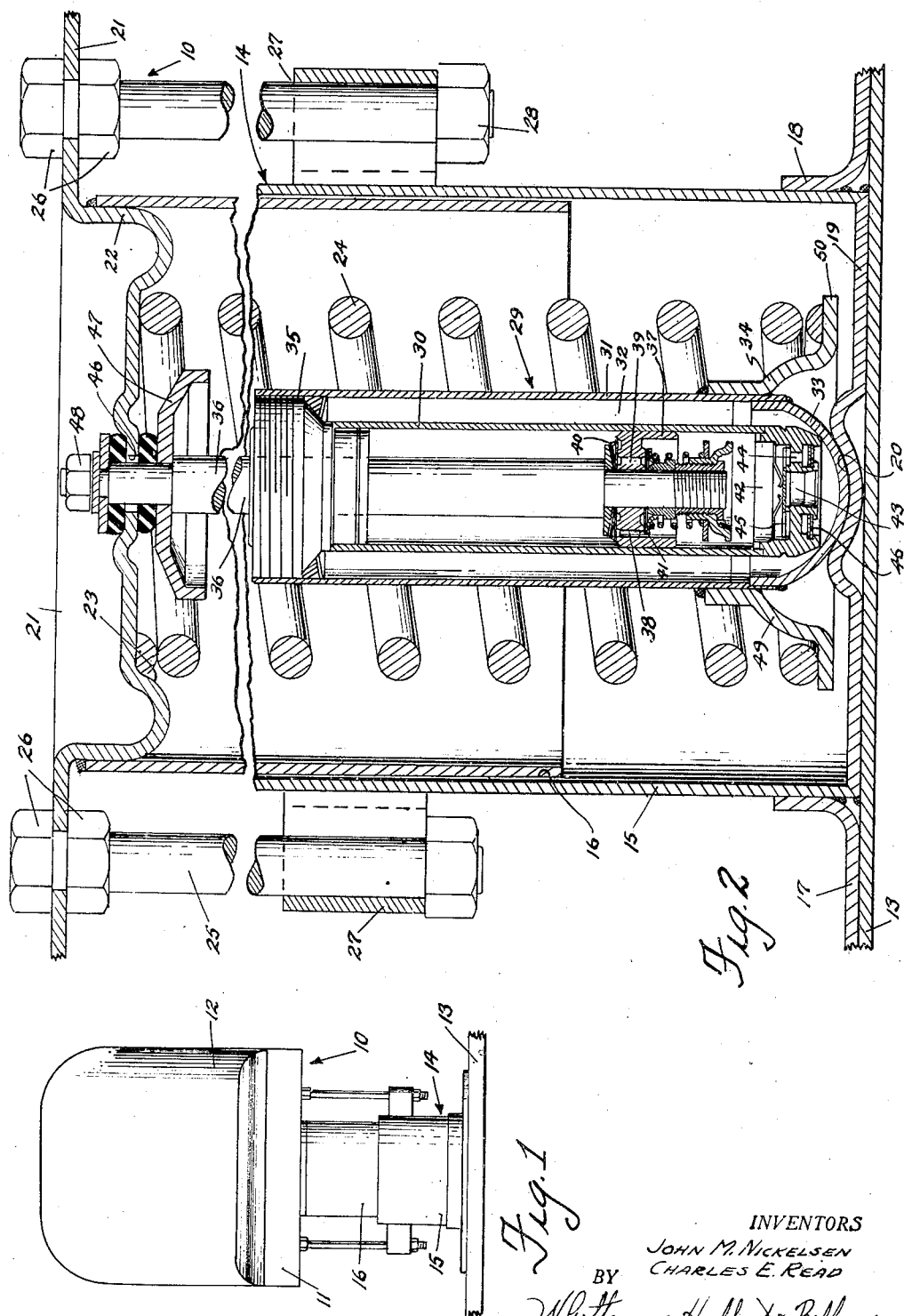
INVENTORS
JOHN M. NICKELSEN
CHARLES E. READ
BY
Whittemore Hulbert & Belknap
ATTORNEYS Patented Oct. 11, 1949

2,484,722

UNITED STATES PATENT OFFICE 2,484,722

SPRING SEAT CONSTRUCTION

John M. Nickelsen, Ann Arbor, and Charles E. Read, Monroe, Mich., assignors to Monroe Auto Equipment Company, Monroe, Mich., a corporation of Michigan Application December 11, 1944, Serial No. 567,642

2 Claims. (Cl. 155—52)

This invention relates to vehicle seats and refers more particularly to improvements in resilient mountings for vehicle seats.

One of the principal objects of this invention is to provide a yieldable seat mounting which may be used on vehicles of the type wherein the frame is nonresiliently connected to the road engaging wheels to protect the occupant of the seat from the fatiguing effects of road roughness or may be employed on vehicles equipped with spring suspension means to assist or coact with the latter in providing superior ride characteristics.

Unfortunately, the chassis engineer in designing suspension systems for vehicles must take into consideration factors other than providing the occupants of the vehicle with the best possible ride under all conditions. In trucks, buses and other vehicles adapted to carry substantial loads, the springs must be sufficiently stiff to prevent "bottoming" when the vehicle is driven over rough or relatively uneven road surfaces and, of course, stiff springs are not conducive to obtaining good riding qualities. The problems of the chassis engineer are not reduced to any material extent when designing suspension systems for relatively light passenger vehicles as the ideal spring rate for a so-called boulevard ride is not practical when the vehicle is driven over relatively uneven or rough roads and, accordingly, some compromise must be made in designing the suspension system.

As a result of the above the occupant of the vehicle at best receives only an average ride, and it is with this in view that the present invention contemplates a seat mounting embodying a suspension spring and double acting shock absorber combined to provide the occupant of the seat with an improved ride regardless of the design of the vehicle suspension system.

The foregoing, as well as other objects, will be made more apparent as this description proceeds, especially when considered in connection with the accompanying drawing, wherein:

Figure 1 is a front elevation of a seat mounted in accordance with this invention; and Figure 2 is a vertical sectional view through the mounting shown in Figure 1.

Referring now more in detail to the drawing, it will be noted that the reference character 10 designates a vehicle seat comprising a cushion portion 11 and a back portion 12. The seat 10 is suspended from a support such as the flooring 13 of a vehicle body by means of a pedestal 14 comprising telescopically engaging tubes 15 and 16.

Upon reference to Figure 2 of the drawing it will be noted that the lower end of the tube 15 is attachable to the vehicle body flooring 13 by a plate 17 having an upstanding annular flange 18 forming a hub of sufficient diameter to receive the lower end portion of the tube 15. The flange 18 is preferably welded or otherwise secured to the tube 15 so that the attaching plate 17 forms a unit with the pedestal.

The lower end of the tube 15 is closed by a plate 19, also welded to the tube 15, and having a centrally disposed spherically shaped recess 20. The tube 16 is closed at the top thereof by means of an attaching plate 21 having marginal portions adapted to be secured to the seat 10 and having the central portion fashioned to form an annular hub 22. The hub portion 22 is sleeved in the upper end of the tube 16 and the latter end is preferably welded to the hub so that the plate 21 also forms a unit with the pedestal. It will further be noted from Figure 2 of the drawing that the central portion of the hub 22 is offset in an upward direction to form an annular recess 23.

The pedestal 14 is normally urged to its extended position by means of a coil spring 24 of the compression type. The coil spring 24 is positioned in the pedestal 14 in concentric relation to the axis of the tubes 15 and 16. The upper end of the spring 24 extends into the recess 23 and seats against the adjacent wall of the hub 22. The lower end of the spring reacts against the support or flooring 13 of the vehicle body so that actually the spring tends to move the tube 16 and seat 10 in an upward direction relative to the tube 15.

The extent of upward movement of the seat 10 by the spring 24 is limited by a pair of studs 25 positioned on diametrically opposite sides of the pedestal 14 and having the upper ends clamped to the plate 21 by means of nuts 26. The lower end portions of the studs 25, respectively, extend freely through suitable ears 27 projecting laterally outwardly from opposite sides of the tube 15 and stops 28 in the form of nuts are mounted on the studs between the ears 27. The nuts 28 abut the lower ends of the ears 27 to restrict the upward movement of the seat by the action of the spring 24, and these nuts are adjustable to enable varying the elevation of the seat.

The action of the suspension spring 24 is controlled by a tubular direct acting shock absorber 29 having a pressure cylinder 30 filled or substantially filled with a hydraulic fluid medium and having an outer tubular casing 31 concentrically positioned with respect to the pressure cylinder. The internal diameter of the casing is greater than the diameter of the pressure cylinder and cooperates with the latter to provide a reservoir 32 around the pressure cylinder. The lower end of the reservoir is closed by a cap 33 having a generally spherically shaped end portion and having an annular flange 34 secured to the lower end of the casing 31. The upper ends of the reservoir and cylinder are closed by a cap 35 centrally apertured to slidably receive a rod 36 having a piston 37 secured to the lower end thereof in sliding contact with the inner wall of the cylinder 30.

The piston 37 is provided with an outer series of ports 38 and with an inner series of ports 39. The outer ports 38 are normally closed by a check valve 40 positioned at the top of the piston 37, and the inner series of ports 39 are closed by a laminated pressure relief valve 41 clamped to the bottom of the piston. The above construction is such as to provide a controlled flow of hydraulic fluid medium in opposite directions through the piston.

The lower end of the cylinder 30 is closed by a valve 42 having a central opening 43 communicating with the reservoir 32 and having a series of ports 44 surrounding the central opening 43 and also communicating with the reservoir. The flow of fluid into the cylinder 30 through the central opening 43 is controlled by a check valve 45, and the flow of fluid from the cylinder 30 to the reservoir 32 is regulated by a laminated pressure relief valve 46.

In operation, when the piston 37 travels downwardly the fluid in the cylinder 30 below the piston flows upwardly through the series of ports 38, and the pressure of this fluid unseats the check valve 40 to permit the fluid to flow into the cylinder above the piston. However, all of the fluid in the cylinder below the piston can not be accommodated in the portion of the cylinder above the piston, due to the displacement of the piston rod. Thus, as the piston continues to move in a downward direction in the cylinder 30 sufficient pressure is built up against the valve 46 to unseat the latter and permit the excess fluid to pass into the reservoir 32 through the ports 44. On the other hand when the piston moves in an upward direction in the cylinder 30, fluid under pressure acts upon the relief valve 41 to open the latter and permit the passage of fluid through the inner series of ports 39 to the portion of the cylinder below the piston 37. As the piston 37 travels upwardly, the rod 36 moves out of the cylinder and, therefore, it is necessary to replenish the cylinder with the hydraulic fluid medium. The required additional amount of fluid is supplied by the reservoir 32 through the check valve 45, which opens relatively freely so that very little or no resistance is offered to the flow of the fluid. Thus, it will be apparent that the recoil or damping action of the shock absorber is regulated by the pressure relief valve 41 on the piston 37, and this valve is calibrated to provide the desired operation.

The shock absorber 29 is positioned in the compression spring 24 and the spherically shaped end of the cap 33 seats in the correspondingly shaped recess 20 formed in the plate 19. The upper end of the rod 36 extends through a central opening 46' through the plate 21 and is clamped to the plate by means of the abutment 47 and clamping nut 48. As shown in Figure 2 of the drawing, the opening 46' is longer in diameter than the portion of the rod 36 extending therethrough and resilient washers are provided on the rod at opposite sides of the plate 21 to provide for limited tilting movement of the shock absorber relative to the pedestal.

The lower end of the shock absorber is clamped in place on the plate 19 by the compression spring 24. As shown in Figure 2, a ring 49 is sleeved on the lower end of the tubular casing 31 and is welded or otherwise securely fastened to the casing. The lower end portion of the ring is flared outwardly and is provided with an annular seat 50 which forms an abutment for the lower end of the spring 24. Thus, it will be seen that the spring not only yieldably supports the seat 10, but in addition serves to anchor the shock absorber to the plate 19 of the pedestal.

What we claim as our invention is:

1. A vehicle seat construction comprising a seat carrying member, a support for the seat carrying member, a pedestal extending between the member and support comprising telescopically engaged tubes, means normally urging the tubes to their extended positions including a compression coil spring positioned in the pedestal in concentric relation to the axis of the tubes and having the opposite ends respectively reacting on the upper end of the uppermost tube and on the support, means determining the elevation of the seat carrying member including stops extending laterally outwardly from opposite sides of the lowermost tube and vertical rods having the upper ends anchored on the seat carrying member and having adjustable abutments on the lower ends respectively engageable with the stops in the extended position of the pedestal.

2. A vehicle seat construction comprising a seat carrying member, a support for said member, a pedestal extending between the member and support comprising telescopically engaged tubes, a closure for the bottom of the lowermost tube and having a spherically shaped recess at the center thereof forming a socket, a hydraulic direct acting tubular type shock absorber extending axially of the pedestal within the latter, a casing for the shock absorber having a spherically shaped portion at the bottom engaging in the spherically shaped socket and providing a universal pivotal mounting for the shock absorber, means connecting the upper end of the shock absorber to the seat carrying member, a coil spring of the compression type surrounding the shock absorber and having the upper end engaging the seat carrying member, and means at the lower end of the shock absorber casing forming a seat for the corresponding end of the coil spring.

JOHN M. NICKELSEN.
CHARLES E. READ.

REFERENCES CITED

The following references are of record in the file of this patent:

UNITED STATES PATENTS

| Number | Name | Date |
|---|---|---|
| 1,423,904 | Blyburg | July 25, 1922 |
| 1,687,527 | Thompson | Oct. 16, 1928 |
| 1,706,585 | Parker | Mar. 26, 1929 |
| 1,838,802 | Bischof | Dec. 29, 1931 |
| 1,988,342 | Slutz | Jan. 15, 1935 |
| 2,041,154 | Slutz | May 19, 1936 |
| 2,183,129 | Binder et al. | Dec. 12, 1939 |
| 2,272,344 | Kimbro | Feb. 10, 1942 |
| 2,334,922 | Gustafson | Nov. 23, 1943 |

FOREIGN PATENTS

| Number | Country | Date |
|---|---|---|
| 134,530 | Switzerland | Oct. 1, 1929 |